Jan. 17, 1950  H. ZUCKERMAN  2,494,980
DETACHABLE SHELF FOR AUTOMOBILE INSTRUMENT PANELS
Filed July 29, 1947
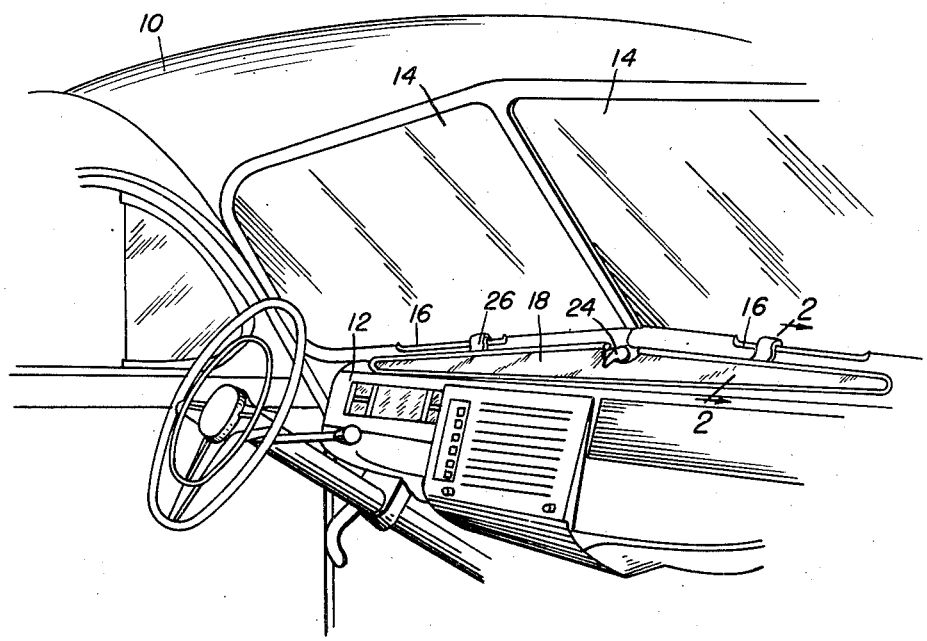
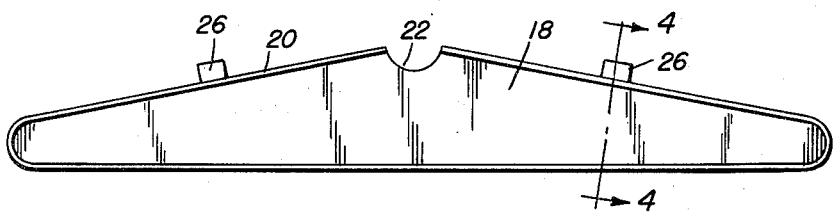
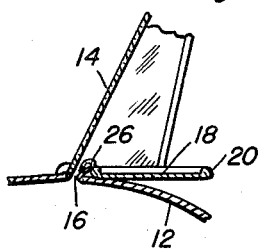
Inventor
Herman Zuckerman
By Clarence A. O'Brien
and Harvey B. Jacobson
Attorneys Patented Jan. 17, 1950

2,494,980

UNITED STATES PATENT OFFICE 2,494,980

DETACHABLE SHELF FOR AUTOMOBILE INSTRUMENT PANELS

Herman Zuckerman, Imperial, Calif.

Application July 29, 1947, Serial No. 764,468

2 Claims. (Cl. 311—21)

This invention comprises novel and useful improvements in a detachable shelf for automobiles and more specifically pertains to a tray constituting an accessory which is particularly adapted to conveniently fit within and be secured to the instrument or dashboard of an automobile vehicle.

A primary object of this invention resides in providing an auxiliary shelf or tray which may be readily applied to and removed from the dashboard of an automobile vehicle.

A further object of the invention is to provide an attachment in accordance with the preceding object which shall be of simple, lightweight construction, economical to manufacture, and highly serviceable for the purposes intended.

A still further purpose of the invention is to provide an attachment in conformity with the foregoing objects which shall be contoured to fit upon a dash or instrument board of an automobile vehicle, and to snugly conform to the dihedral angle with which most automobile windshields are constructed, and which may be readily secured and detachably retained in the customary defroster openings of the dashboard.

These, together with various ancillary objects of the invention which will later become apparent as the following description proceeds, are attained by this device, a preferred embodiment of which has been illustrated by way of example only in the accompanying drawings, wherein:

Figure 1 is a fragmentary perspective view of a portion of an automobile vehicle showing the interior thereof, the windshield and a portion of the dash or instrument board, together with this invention applied thereto;

Figure 2 is a vertical transverse sectional view showing certain structural features and arrangement of the invention, and is taken substantially upon the plane of the section line 2—2 of Figure 1;

Figure 3 is a top plan view of the tray forming the subject matter of this invention; and Figure 4 is a vertical transverse sectional detail view taken substantially upon the plane of the section line 4—4 of Figure 3.

Referring now more specifically to the accompanying drawing, wherein like numerals designate similar parts throughout the various views, there has been illustrated in Figure 1 a portion of an automotive vehicle indicated at 10 which is provided with a customary instrument panel or dashboard 12, surmounted by the usual windshield members 14 which in accordance with conventional practice, are disposed at a dihedral angle.

As shown in Figures 1 and 3, the instrument panel adjacent the windshield is provided with the conventional defroster opening 16.

The shelf or tray forming the substance of this invention consists of a plate 18 which may be formed of any suitable and convenient material, and which as shown in Figure 3 is preferably of generally triangular configuration and provided with a marginal upturned rim portion 20 which serves to prevent articles placed thereon from sliding off of the tray. In accordance with the dictates of this invention, the rear or outer surface of the tray is preferably straight while the inner surface has two angularly inclined edges which are shaped to conform to the dihedral angle of the windshield sections 14, and to fit snugly against the rim of the windshield frame and adjacent the defroster openings 16. As will readily be understood, the tray may be of any desired size, and preferably the angle formed by the front edges thereof will be adapted to a particular type of car with which the tray is intended for use. Preferably at the apex of the two front edges of the tray, a semi-circular recess or notch 22 is provided for the purpose of receiving and clearing a windshield wiper control 24 or any other instrument found at this point of the dash. At suitable locations upon its forward inclined edges, the tray is provided with a plurality of supporting brackets 26, whose construction is clearly shown in Figure 4, and which are intended for insertion into the defroster opening 16, to thereby comprise fastening means or hooks for supporting the tray in horizontal position upon the dash in the manner indicated in Figures 1 and 2.

Obviously, the tray may be quickly installed into operative position and removed when its use is no longer required. The tray serves as a convenient accessory for providing a shelf or table and is particularly useful as contributing to the comfort of the passengers of a vehicle when eating or drinking therein.

Since it is believed that the manner of constructing and employing the device will be readily understood from the foregoing, further explanation is believed to be unnecessary.

As numerous modifications of the invention will readily occur to those skilled in the art, after a consideration of the foregoing specification and accompanying drawings, it is not intended to limit the invention to the exact construction shown and described, but all suitable modifications and equivalents may be resorted to, falling within the scope of the appended claims.

Having described the invention, what is claimed as new is:

1. A detachable shelf for an automobile of the type having a windshield, an instrument panel adjacent said windshield and defroster openings in said instrument panel for directing air against said windshield, comprising; a tray having a front edge closely adjacent said windshield, said tray having its bottom surface supported solely by the front portion of the upper surface of said instrument panel adjacent said windshield, fasteners secured to said tray and extending into said defroster openings.

2. A detachable shelf for an automobile of the type having a windshield, an instrument panel adjacent said windshield and defroster openings in said instrument panel for directing air against said windshield, comprising; a tray having a front edge closely adjacent said windshield, said tray having its bottom surface supported solely by the front portion of the upper surface of said instrument panel adjacent said windshield, fasteners secured to said tray and extending into said defroster openings, said tray having a peripheral upstanding rim, said fasteners comprising hooks extending forwardly from said rim.

HERMAN ZUCKERMAN.

REFERENCES CITED

The following references are of record in the file of this patent:

UNITED STATES PATENTS

| Number | Name | Date |
| --- | --- | --- |
| 20,548 | Haven | June 15, 1858 |
| 890,693 | McCoy | June 16, 1908 |
| 1,173,859 | Porter | Feb. 29, 1916 |
| 1,426,787 | Spencer | Aug. 22, 1922 |
| 1,593,835 | McNeal et al. | July 27, 1926 |
| 1,681,210 | Banks | Aug. 21, 1928 |
| 1,723,238 | Hoot | Aug. 6, 1929 |
| 1,883,714 | Gray | Oct. 18, 1932 |
| 1,958,266 | De Foe et al. | May 8, 1934 |
| 1,965,955 | De Foe et al. | July 10, 1934 |
| 1,974,213 | Gilbert | Sept. 18, 1934 |
| 2,299,025 | McGinley | Oct. 13, 1942 |

FOREIGN PATENTS

| Number | Country | Date |
| --- | --- | --- |
| 354,071 | Great Britain | Aug. 6, 1931 |
| 434,898 | Great Britain | Sept. 11, 1935 |